US012588601B2

(12) United States Patent
Dreher

(10) Patent No.: US 12,588,601 B2
(45) Date of Patent: Mar. 31, 2026

(54) PICKING-UP DEVICE FOR BALES, AND PICKING-UP SYSTEM COMPRISING A PICKING-UP DEVICE

(71) Applicant: Ingo Dreher, Balgheim (DE)

(72) Inventor: Ingo Dreher, Balgheim (DE)

( * ) Notice: Subject to any disclaimer, the term of this patent is extended or adjusted under 35 U.S.C. 154(b) by 855 days.

(21) Appl. No.: 17/892,087

(22) Filed: Aug. 21, 2022

(65) Prior Publication Data

US 2023/0000019 A1     Jan. 5, 2023

Related U.S. Application Data

(63) Continuation of application No. PCT/EP2021/052227, filed on Jan. 31, 2021.

(30) Foreign Application Priority Data

Feb. 20, 2020     (DE) ..................... 10 2020 104 524.7

(51) Int. Cl.
*A01D 89/00*          (2006.01)

(52) U.S. Cl.
CPC ......... *A01D 89/003* (2013.01); *A01D 89/004* (2013.01)

(58) Field of Classification Search
CPC .... A01D 89/003; A01D 89/004; A01D 90/08; Y02E 50/10; Y02E 50/30; B65D 88/005;
(Continued)

(56) References Cited

U.S. PATENT DOCUMENTS 3,278,050 A    10/1966    Tarbox
4,372,722 A     2/1983    Van Horn
(Continued)

FOREIGN PATENT DOCUMENTS

DE        23 40 692 A1    2/1975
DE        29 30 275 A1    2/1980
(Continued)

OTHER PUBLICATIONS

International Standard, Norm ISO 668, Series 1 freight containers—Classification, dimensions and ratings, Switzerland, Jan. 2020, 22 pages.

*Primary Examiner* — Lynn E Schwenning
(74) *Attorney, Agent, or Firm* — ASLAN LAW, P.C.

(57)          ABSTRACT

The invention relates to a picking-up device for bales (14) formed by compression of an, in particular, long-stemmed plant material, comprising a first side part (48), a second side part (50) spaced apart relative thereto in a first spatial direction (42), and connection units (66) for connecting the side parts (48, 50) along the first spatial direction (42), wherein the side parts (48, 50) are designed to assume a transport state relative to one another in which a receiving space (40) is defined between the side parts (48, 50) and bales (14) are positioned, for transport purposes, between the side parts (48, 50) in the receiving space (50), and to assume a filling state in which the side parts (48, 50) are at a greater distance relative to one another in the first spatial direction (42) than in the transport state and in which the bales (14) are instertable into the receiving space (40) along a second spatial direction (44) transverse to the first spatial direction via an insertion opening (68) arranged between the side parts (48, 50). In addition, the invention relates to a picking-up system with such a picking-up device.

31 Claims, 12 Drawing Sheets

(58) Field of Classification Search
CPC ...... B65D 88/52; B65D 88/58; B65D 90/021;
B65D 90/205; B65D 90/046; B65D
90/047; B65D 88/522; B65D 88/524
USPC ......................................................... 414/111
See application file for complete search history.

(56) References Cited

U.S. PATENT DOCUMENTS

| | | | | |
|---|---|---|---|---|
| 7,703,632 | B2 * | 4/2010 | Kochanowski | ...... B65D 88/522 |
| | | | | 220/666 |
| 9,861,041 | B2 * | 1/2018 | Verhaeghe | ............ A01F 15/042 |
| 2015/0296714 | A1 | 10/2015 | Dreher | |
| 2022/0185578 | A1 * | 6/2022 | Coomer | ................ B65D 77/06 |

FOREIGN PATENT DOCUMENTS

| | | | | | | |
|---|---|---|---|---|---|---|
| EP | 3 556 547 | A1 | 10/2019 | | | |
| EP | 3 563 663 | A1 | 11/2019 | | | |
| GB | 1 467 476 | A | 3/1977 | | | |
| GB | 2 026 429 | A | 2/1980 | | | |
| WO | WO 96/22010 | A1 | 7/1996 | | | |
| WO | WO 2014/195314 | A1 | 12/2014 | | | |
| WO | WO 2014/067512 | A1 | 5/2015 | | | |
| WO | WO 2016/100223 | A1 | 6/2016 | | | |
| WO | WO 2018/136994 | | * | 8/2018 | ............ | B65D 88/22 |
| WO | WO 2019/165491 | A1 | 9/2019 | | | |

* cited by examiner

PICKING-UP DEVICE FOR BALES, AND PICKING-UP SYSTEM COMPRISING A PICKING-UP DEVICE

CROSS-REFERENCE TO RELATED APPLICATIONS

This application is a continuation application of international application number PCT/EP2021/052227, filed on Jan. 31, 2021, and claims the benefit of German application number 10 2020 104 524.7, filed on Feb. 20, 2020, which are incorporated herein by reference in their entirety and for all purposes.

FIELD OF THE INVENTION

The present invention relates to a picking-up device for bales formed by compression of an, in particular, long-stemmed plant material, wherein the picking-up device is provided in particular for transport purposes in order to pick up the bales during transport from a filling location to a utilization location or a storage location.

Furthermore, the present invention relates to a picking-up system having at least one picking-up device.

BACKGROUND OF THE INVENTION

With regard to utilization of plant material as biomass, it is advantageous to compress the harvested crop into bales for transport purposes and for storage. For this purpose, pressing devices are known, by means of which loose or pre-compressed plant material is introduced into a pressing space and compressed therein by means of a pressing member to form a bale. The bales thus formed can be transported to a utilization location. In particular, gasification of the plant material with release of the energy content of the plant material is possible as a utilization. Different plants can be suitable for such utilization.

However, reed grass (giant silver grass, Miscanthus x gigantus) and corn should in particular be emphasized. However, the present invention is not limited to the use of the picking-up device for bales consisting of these plants.

With regard to a subdivision of the harvested plant material into transport and energy units that are as similar as possible, WO 2014/067512 A1 proposes compressing the plant material into bales of substantially constant volume and substantially constant density. As a result, it is possible to provide, to a certain extent, manageable "energy units" in the form of biomass.

It is desirable to transport bales in a manner that makes the most efficient possible use of existing transport paths and advantageously standardized transport devices.

An object underlying the present invention is to provide a picking-up device for bales and a picking-up system comprising such a picking-up device which enables simple and efficient pick-up of bales for transport purposes.

SUMMARY OF THE INVENTION

In a first aspect of the invention, a picking-up device for bales formed by compression of an, in particular, long-stemmed plant material, comprises a first side part, a second side part spaced apart relative thereto in a first spatial direction, and connecting units for connecting the side parts along the first spatial direction. The side parts are formed so as to assume a transport state relative to one another in which a receiving space between the side parts is defined and bales are positioned, for transport purposes, between the side parts in the receiving space, and to assume a filling state in which the side parts are at a greater distance relative to one another in the first spatial direction than in the transport state, and in which filling state the bales can be inserted into the receiving space along a second spatial direction transverse to the first spatial direction via an insertion opening arranged between the side parts.

In a further aspect of the invention, a picking-up system for bales formed by compression of an, in particular, long-stalked plant material comprising is provided. The picking-up system comprises a support device and at least one picking-up device in accordance with the first aspect which can be releasably placed on the support device.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
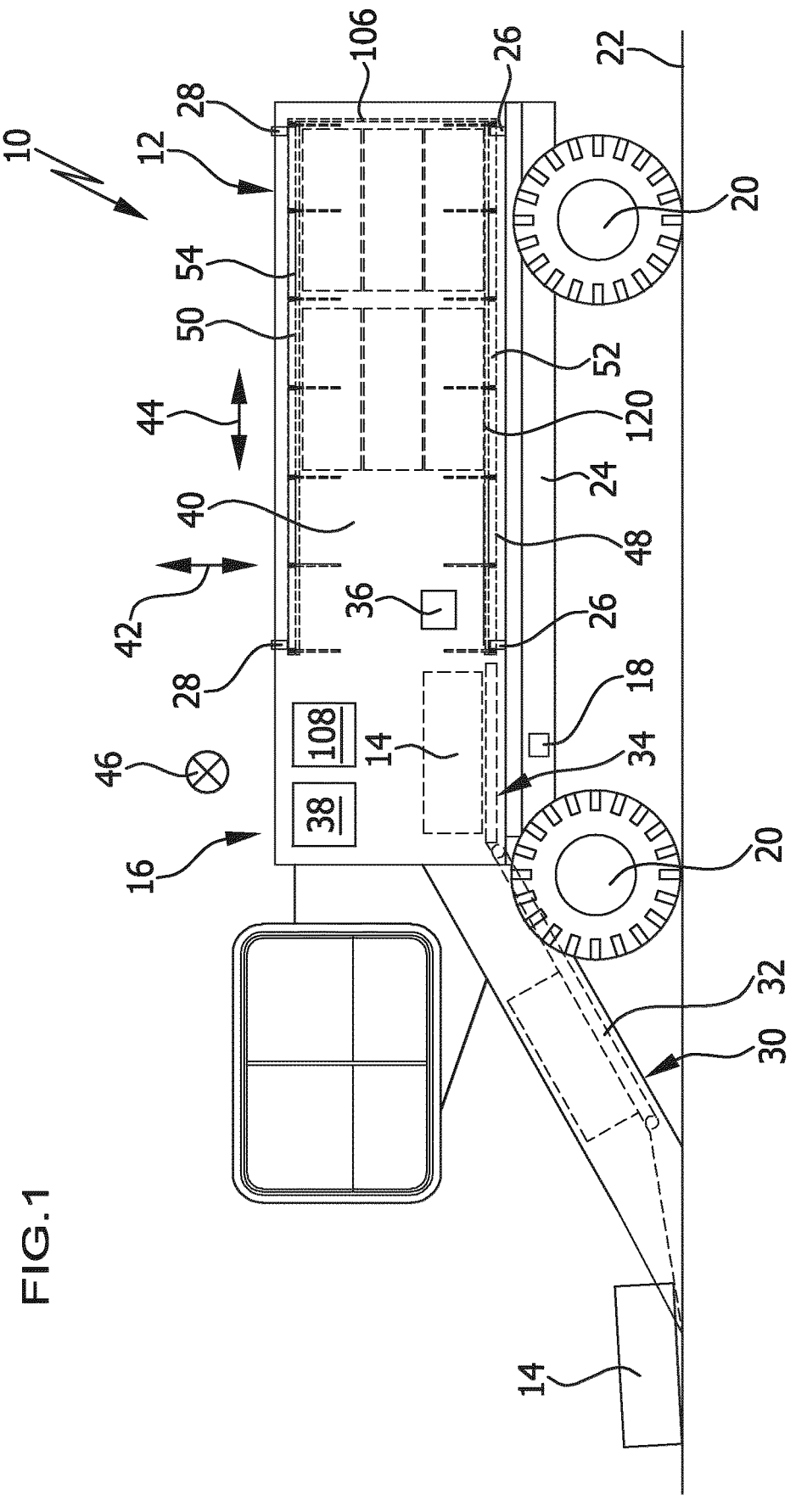
FIG. 1: shows a schematic view of a preferred embodiment of the picking-up system in accordance with the invention, comprising a preferred embodiment of the picking-up device in accordance with the invention.

Although the invention is illustrated and described herein with reference to specific embodiments, the invention is not intended to be limited to the details shown. Rather, various modifications may be made in the details within the scope and range of the equivalents of the claims and without departing from the invention.

The present invention relates to a picking-up device for bales formed by compression of an, in particular, long-stemmed plant material. The picking-up device comprises a first side part, a second side part spaced apart relative thereto in a first spatial direction, and connecting units for connecting the side parts along the first spatial direction. The side parts are formed so as to assume a transport state relative to one another in which a receiving space between the side parts is defined and bales are positioned, for transport purposes, between the side parts in the receiving space, and to assume a filling state in which the side parts are at a greater distance relative to one another in the first spatial direction than in the transport state, and in which filling state the bales can be inserted into the receiving space along a second spatial direction transverse to the first spatial direction via an insertion opening arranged between the side parts.

In the picking-up device in accordance with the invention, two side parts spaced apart along one spatial direction are provided, the distance of which side parts from one another is variable. In the filling state, the bales can be introduced into the receiving space. If the side parts are brought closer to one another, they can assume the transport state, in which the receiving space preferably is completely or substantially completely filled. The filling of the receiving space takes place along the second spatial direction, which is oriented to be transverse and, in particular, perpendicular to the first spatial direction.

The picking-up unit can preferably be lifted by means of a lifting device and loaded onto a vehicle for transport. This can, for example, be a road vehicle or a rail vehicle. After transport, the picking-up device can be lifted from the vehicle and brought into a position provided for the purpose of unloading. The unloading of the bales preferably takes place in the opposite manner to the filling, wherein the side parts are first transferred into the "filling state," i.e., in this case, a state intended for unloading, and the bales are subsequently removed from the receiving space.

Advantageously, several connection units are provided, between which the receiving space is arranged and which are spaced apart from one another along a third spatial direction, which is oriented transverse and, in particular, perpendicular to the first spatial direction, wherein the connection units engage in each case the first side part and the second side part. In relation to the third spatial direction, connection units can be spaced apart from one another and engage sides of the first side part and of the second side part facing away from one another. The receiving space is arranged between the connection units in the third spatial direction.

Preferably, a plurality of connection units spaced apart from one another in the second spatial direction are provided, wherein an engagement opening is formed in the receiving space, in each case, between the connection units.

For each side part, it can be provided that in each case a plurality of connection units engage sides facing away from each other with respect to the third spatial direction.

It can be provided that, in the third spatial direction, at the end, a connection unit be arranged in each case in the picking-up device.

The third spatial direction is preferably oriented transverse and, in particular, perpendicular to the second spatial direction.

The insertion opening is advantageously formed on an end side of the picking-up device, between the side parts and/or between the connection units. In this case, the insertion opening preferably extends over the entire or substantially entire end side. This facilitates the insertion of bales into the receiving space.

It is advantageous if the picking-up device is open at the insertion opening in the transport state. In this way, a structurally simple design of the picking-up device can be achieved.

In order to achieve the same advantage, it is advantageous if the picking-up device is open opposite the insertion opening in relation to the second spatial direction.

The side parts are advantageously interconnected in the filling state, wherein the connection units are designed to be variable in length in order to enable the transfer of the side parts from the transport state into the filling state, and vice versa. By changing the length of the connection units, the distance between the side parts can be increased. For example, the connection units are extendable—for example, telescopic. In a preferred embodiment, the connection units can assume different clamping states, for example. In the case of decreasing or reduced tension, it is preferably possible to increase the distance of the side parts from one another. On the other hand, with increased tension, the distance can be reduced.

It is advantageous if the first side part is a base part of the picking-up device, and the second side part is a cover part of the picking-up device. The picking-up device can be placed on a set-down surface or a supporting device, e.g., a vehicle, via the base part.

Position and orientation information such as "base" and "cover" in the present case refer to an intended use of the picking-up device and the picking-up system. In this case, the base part is arranged at the bottom of the picking-up device in the direction of gravity, and the cover part is arranged at the top of the picking-up device in the direction of gravity.

The first spatial direction can accordingly, in particular, be a height direction—for example, a vertical. The second and/or the third spatial direction can extend along a transverse direction—for example, in each case, in a horizontal.

It is advantageous if the cover part comprises or forms a plate-shaped cover element which covers the receiving space at least in part, and preferably completely. As a result, the bales are, in particular, protected against rain in the receiving space.

The connection units can preferably extend or be oriented in a height direction of the picking-up device.

It is found to be advantageous for the first side part and/or the second side part to be formed as or to comprise a grating. In the present case, this can be understood, in particular, to mean that the first and/or the second side part comprises or forms a frame—for example, of interconnected components such as profile parts or carriers. The grating or frame is made of metal, for example.

The formation as a grating or frame enables a, structurally, particularly simple design of the picking-up device at a simultaneously low weight. The payload that can be carried with a transport vehicle can thereby be increased.

It is found to be advantageous if engagement openings for a transport device to engage in the receiving space are formed in the base part. This will be discussed below. The receiving space can be filled with bales in a simpler manner by means of the transport device.

In a preferred embodiment, the picking-up device can be designed as a frame that can be expanded from the filling state into the transport state in the first spatial direction, or can comprise such a frame.

With regard to a structurally simple configuration, it is advantageous if the picking-up device between the side parts is free of side walls. In particular, as already mentioned, the picking-up device can be open at the insertion opening and opposite thereto, and can moreover comprise connection units which are spaced apart from one another in the second spatial direction and are separated by gaps.

It is advantageous if the picking-up device in the receiving space is free of intermediate floors and/or free of intermediate walls. In this way, a structurally simple design of the picking-up device can be achieved. By omitting intermediate floors and/or intermediate walls, the payload that can be carried by a transport vehicle can be increased.

It is found to be advantageous if the picking-up device comprises or forms a clamping device, under the action of which, in a clamping state, the first side part and the second side part are braced relative to one another in the transport state, wherein the clamping device can be transferred into a release state in which the side parts are movable relative to one another in order to assume the filling state. If the clamping device assumes a clamping state, the side parts are braced relative to one another—in particular, in order to assume the transport state. In the release state of the clamping device, a "relaxed state" or a state of reduced tension, so to speak, the side parts can be moved relative to one another and, in particular, brought to a greater distance from one another, in order to assume the filling position.

Providing the clamping device makes it possible to fix the bales in the receiving space between the side parts and, in particular, to the side parts. A separate load securing of the bales in the receiving space can be dispensed with. In this way, a particularly simple structural configuration of the picking-up device can be achieved.

Accordingly, it is advantageous if the bales are held, in the transport state, by the side parts, and the picking-up device is free of separate load securing means for the bales.

It is found to be advantageous if the connection units each comprise a tension element which engages the first side part and the second side part, if the picking-up device comprises at least one clamping device for tensioning the respective tension element, and if the first side part and the second side part, relative to one another, can be braced against one another under a tensioning effect of the tension element. The, in particular, deformable tension element can assume different clamping states. Depending upon this, the side parts can be braced against each other. The clamping states, in particular, include a relaxed or more relaxed state in the sense that the side parts can be moved away from one another in order to transfer them into the filling state.

The tension element is, for example, a cable or a belt, wherein a steel cable is provided in a preferred embodiment.

It can be provided that the tension element be fixedly connected to one of the side parts.

Advantageously, at least one storage device is provided for the tension element, wherein the tension element can be tensioned or relaxed by acting on the storage device. In particular, the tension element can be tensioned by winding onto the storage device and released by unwinding.

A deflecting element for the respective tension element can be provided on one of the side parts, for example, in order to deflect said side part in the direction of the storage device.

The storage device is or comprises, for example, a drum, a reel, a spindle, a coil, or a shaft around which the tension element can be wound. In a preferred embodiment, in, for example, a hollow profile of one of the side parts, a rotatable shaft can be provided as a storage device.

Expediently, two or more tension elements of several connection units are assigned a common storage device. In this way, separate storage units can be omitted, and the structural design of the picking-up device can be simplified. For example, several tension elements can be wound together on a drum or shaft.

A drive device for the at least one storage device can be provided, e.g., for rotating a drum or a shaft, in order to wind or unwind the at least one tension element.

Alternatively or additionally, a clamping member can be provided, under the effect of which the tension element can be wound on the storage device. By means of the clamping member, the storage device can be pretensioned—for example, with regard to a winding of the tension element.

The respective connection unit preferably comprises a guide element on at least one of the side parts, and preferably on both side parts, along which the tension element is guided in portions. It is evident that a reliable function of the connection units can thereby be ensured.

The guide element is preferably hinged to the side part and pivotable relative thereto about a pivot axis preferably extending in the second spatial direction.

The guide element can be formed, for example, so as to be rod-shaped or strip-shaped, wherein the tension element can preferably rest against the guide element.

It can be provided that the guide element be sleeve-shaped and that the tension element be guided via the guide element.

It is expedient for the guide element to be transferable from a folded-out position into a folded-in position, wherein a free end of the guide element is farther away from the side part in the folded-out position than in the folded-in position.

It can be provided that the guide element be arranged, in a folded position, in a plane defined by the side part, and/or be able to be placed against the side part.

In particular, it can be provided that the guide element be oriented, in a folded-out position, in the direction of the other side part in each case, and be able to be transferred into a folded-in position in which the guide element rests against the side part and is arranged in the plane thereof. This makes it possible, for example, to fold the picking-up device together, as explained below.

The connection unit preferably comprises a restoring element, which acts on the guide element with a force directed towards the side part, and against the effect of which the guide element can be pivoted relative to the side part by pulling on the tension element.

The restoring element is, advantageously, a torsion spring which engages the side part and the guide element, and surrounds a pivot element defining the pivot axis. The guide element is mounted pivotably on the side part via the shaft, and the torsion spring can apply the restoring force.

The restoring element can be a pretensioning element, which biases the guide element in the direction of the side part.

It is advantageous if the side parts can be transferred relative to one another from the transport state into a storage state, in which the distance of the side parts from one another along the first spatial direction is smaller than in the transport state.

The side parts can advantageously be placed against each other in the storage state.

The picking-up device can, in particular, advantageously be folded together in a space-saving manner and stored flat.

It can be provided that a plurality of picking-up devices be able to be stacked one above the other. This proves advantageous for transport purposes, for example. Connection elements can be provided on the picking-up devices in order to interconnect picking-up devices located one above the other.

The picking-up device is preferably cuboid at least in the transport state of the side parts.

It is expedient if the receiving space has a length, a width, and/or a height which corresponds to an integer multiple, or approximately or substantially an integer multiple, of a length of the bale. In this way, it is possible to fill the receiving space completely or substantially completely with bales.

In a preferred embodiment, it can be provided that three bales be arranged one behind the other, in the receiving space, in a longitudinal direction of the picking-up device (for example, the second spatial direction). In a transverse direction (for example, the third spatial direction), two bales, for example, can be arranged next to one another in the receiving space. In a height direction (for example, the first spatial direction), three bales, for example, can be arranged above one another, in the receiving space. As a result, preferred embodiments may accommodate 18 bales, for example. In the above example, the bales have, for example, a length of approximately 196 cm, a width of approximately 116 cm, and a height of approximately 79 cm.

In the transport state of the side parts, the picking-up device preferably has dimensions of a 20-foot container or a 40-foot container of the ISO 668 standard. The internal dimensions of the 20-foot container were taken as the basis for the above fitting example of the picking-up device.

The first side part and/or the second side part preferably comprises locking elements for fixing the picking-up device on a support device. These are, in particular, locking elements as are provided in standardized cargo containers of the ISO 668 standard. As a result, the picking-up device has a high versatility and can coordinate with standardized support devices for such containers.

Locking elements or connection elements can be provided in order to fix the picking-up device to a picking-up device of the same design. This can be advantageous, for example, when stacking picking-up devices, as mentioned above.

As already mentioned, the present invention also relates to a picking-up system.

A picking-up system in accordance with the invention, which achieves the object mentioned at the outset, for bales formed by compression of an, in particular, long-stalked plant material, comprises a support device and at least one picking-up device of the aforementioned type which can be releasably placed on the support device.

The advantages which were already mentioned in connection with the explanation of the picking-up device in accordance with the invention can also be achieved in the picking-up system. In this regard, reference can be made to the above statements.

Advantageous embodiments of the picking-up system in accordance with the invention result from advantageous embodiments of the picking-up device in accordance with the invention.

Corresponding locking elements for releasable locking of the side part on the supporting device can preferably be arranged on the support device and on the first side part, via which the picking-up device can preferably be placed on the support device.

A transport device, which engages in engagement openings formed in the base part, for transporting bales in the receiving space in the second spatial direction, is preferably arranged on the support device. For example, in the embodiment of the base part as a grating, the transport device can engage in the receiving space. This makes it easier to insert the bales into the receiving space.

For example, the transport device is or comprises a conveyor belt or transport rollers.

The transport device can be designed to be driven or passive.

It is expedient if a displacement device for bales is arranged on the support device, upstream of the insertion opening, for displacing the bales in the third spatial direction. Associated bales can be displaced by means of the displacement device in the third spatial direction, which is oriented, in particular, in a transverse direction of the picking-up device and perpendicularly to the second spatial direction in which the bales are transported into the receiving space. Supplied bales can, for example, be positioned laterally next to one another by means of the displacement device, in front of the insertion opening. Subsequently, bales positioned next to one another can be moved into the receiving space in the second spatial direction.

The displacement device comprises, for example, a transport path with a conveyor belt or transport rollers.

The displacement device can have a drive device or be designed to be passive.

It is advantageous if the picking-up system comprises a lifting device for bales, by means of which at least one bale can be raised and placed on a bale positioned or positionable underneath. By means of the lifting device, bales can be stacked on top of one another in order to make the best possible use of the receiving space in the height direction. For example, at least one bale is raised, and a further bale is positioned under it, whereupon the first bale is lowered again.

The lifting device is preferably positioned behind the insertion opening in the second spatial direction, in particular, directly laterally next to the insertion opening, in relation to the second spatial direction.

The lifting device expediently comprises lifting elements which can engage in the receiving space from sides, facing away from one another, of the picking-up device in the third spatial direction. For example, the lifting elements pass through engagement openings between the connection units. For lifting the bales, the lifting elements can engage in the receiving space and be brought into engagement with the bales. After lifting, another bale can be positioned under a raised bale. In particular, it is possible to stack a plurality of bales one above the other in this way.

The picking-up device and/or the picking-up system can, in particular, comprise a control device for actuating the actuatable components, in particular, a transport device, the displacement device, and/or the lifting device.

The picking-up system preferably comprises a collecting device for collecting the bales from a floor surface. For example, pressed bales are left by a pressing device on the floor surface, which can, for example, be the agricultural area. The bales are collected via the collecting device and fed to the picking-up device.

It is expedient if the picking-up system comprises or forms a vehicle. The vehicle can preferably be moved on an agricultural area. The picking-up system can thereby be used in a mobile manner, and thus the transport of the bales can be facilitated.

The vehicle advantageously has a traction drive.

In particular, the vehicle can be designed to be self-propelled and self-steering. The vehicle can drive autonomously on agricultural areas. Bales that are left behind thereon can preferably be picked up and deposited in the picking-up device.

FIG. 1 is a schematic view of a picking-up system in accordance with the invention, denoted overall by the reference numeral 10, in a preferred embodiment. The picking-up system 10 comprises a preferred embodiment of the picking-up device 12 in accordance with the invention.

The picking-up system 10 serves to receive bales 14 of compressed plant material and to feed them to the picking-up device 12. In particular, the bales 14 can be stacked in the holding device 12 in a space-saving manner, in the manner described in the following, and transported therein.

The picking-up system 10 comprises a vehicle 16 with a traction drive 18 for driving wheels 20. The vehicle 16 can be moved on a usable area 22 on which the bales 14 are positioned. The usable area 22 is preferably an agricultural area on which the plants, compressed into bales 14, are grown.

The bales 14 can be provided by compression, by means of a pressing device (not shown), from the harvested plant material. In this case, the bales 14 preferably have a cuboid shape with predefined length, width, and height dimensions. Preferably, the bales 14 can have a predefined mass and, accordingly, a predefined density.

The vehicle 16 comprises a support device 24. The picking-up device 12 can be detachably placed on the support device 24. Locking elements 26 on the support device 24 and on the picking-up device 12 can coordinate in order to fix the picking-up device 12 on the support device 24.

The picking-up device 12 can have at least one connection element 28, for example, on the top side. A lifting device (not shown in the drawings) can engage in the at least one connection element 28. This makes it possible to lift the picking-up device 12 from the support device 24 and to place it for transport on a vehicle (not shown in the drawings). The vehicle can, for example, be a road vehicle or a rail vehicle, by means of which the picked-up bales 14 are transported to a utilization location or storage location.

Alternatively, it is conceivable to transport the bales 14 by means of the vehicle 16 itself to the utilization location or storage location.

The picking-up system 10 comprises a collecting device 30, by means of which the bales 14 can be lifted from the useable area 22 and fed via a transport path 32. In the longitudinal direction of the vehicle 16, the bales 14 are transported to a displacement device 34, by means of which the bales 14 can be displaced transversely to the vehicle direction. Furthermore, the picking-up system 10 comprises a lifting device 36 for lifting the bales 14 before or after the insertion into the picking-up device 12.

The displacement device 34 and the lifting device 36 will be discussed again below.

The vehicle 16 may be guided by a user. Alternatively or in addition, it is conceivable that the vehicle 16 is self-driving and self-steering. In particular, in addition to the autonomous travel, autonomous pick-up of the bales 14 from the useable area 22 and an autonomous filling of the picking-up device 12 can be provided.

The picking-up system 10 comprises a control device 38, by means of which the actuatable components of the picking-up system 10 can be controlled. These include, for example, the traction drive 18, the collecting device 30, the displacement device 34, and the lifting device 36.

In the following, the structure and mode of operation of the picking-up device 12 is discussed, with reference first to FIGS. 2 to 9.

As can initially be seen in particular from FIGS. 2 to 6, the picking-up device 12, in a state of use, which is understood in the following in particular as a transport state, is substantially cuboid in design. The picking-up device 12 preferably has dimensions of a standardized transport container in accordance with ISO 668, in particular, a 20-foot container. This applies to the outer dimensions of the picking-up device 12 in order to transport it using existing transport vehicles and transport capacities.

In the transport state of the picking-up device 12, said device defines a receiving space 40 in which the bales 14 are positioned. Expediently, the dimensions of the receiving space 40 correspond to the internal dimensions of a standardized container in accordance with the ISO 668 standard, in particular, the already mentioned 20-foot container.

The picking-up device 12 extends along three spatial directions, namely a first spatial direction 42, a second spatial direction 44, and a third spatial direction 46. The spatial directions 42, 44, 46 are positioned, in pairs, to be transverse, and, in particular, in pairs, perpendicular to one another. The spatial direction 44 corresponds to a height direction, and in particular a vertical. The spatial direction 44 corresponds to a longitudinal direction, and in particular a horizontal. The spatial direction 46 corresponds to a transverse direction, and in particular a horizontal.

In the intended use with the vehicle 16, the picking-up device 12 is positioned with the spatial direction 44 along the longitudinal direction of the vehicle 16 (FIG. 1).

The picking-up device 12 comprises a first side part 48 and a second side part 50. The first side part 48 is in particular a base part 52, and the second side part 50 is a cover part 54.

Position and orientation information such as "bottom," "top," "floor," or "cover" relate, in the present case, to an intended use of the picking-up device 12. In this case, the base part 52 rests upon the support device 24.

The locking elements 26 are arranged, for example, on the base part 52. In particular, locking elements 26 for containers in accordance with the ISO 668 standard can be provided, whereby fastening of the picking-up device 12 to a standardized transport vehicle is made possible.

In the present case, the base part 52 is designed as a grating 56. The grating 56 forms a frame of interconnected profiles.

The profiles comprise two longitudinal profiles 58 extending in the spatial direction 44, which are spaced apart from one another in the spatial direction 46 and are aligned in parallel with one another. The longitudinal profiles 58 are interconnected by means of transverse profiles 60, which extend along the spatial direction 46 and are spaced apart from one another along the spatial direction 44.

In the present case, transverse profiles 60 are arranged at the end, in relation to the spatial direction 44. Overall, seven transverse profiles 60 are provided, wherein it is also possible for the number thereof to be different.

The transverse profiles 60 are positioned equidistantly from one another, wherein an engagement opening 62 in the base part 52 is formed between adjacent transverse profiles 60 in each case.

The cover part 54 also comprises a grating 56. This is only partially shown in the drawing. Preferably, the gratings 56 are configured to be identical or symmetrical to one another.

In the present case, the cover part 54 comprises a plate-shaped cover element 64. The cover element 64 is arranged on the side, facing away from the receiving space 40, of the cover part 54. Bales 14 arranged in the receiving space 40 are thereby protected against rain, for example.

In the intended use, the base part 52 and the cover part 54 are spaced apart from one another along the spatial direction 42, and define between them the receiving space 40 in which bales 14 are positioned. This defines a transport state of the side parts 48, 50, and at the same time a transport state of the picking-up device 12.

Figures 3, 4:
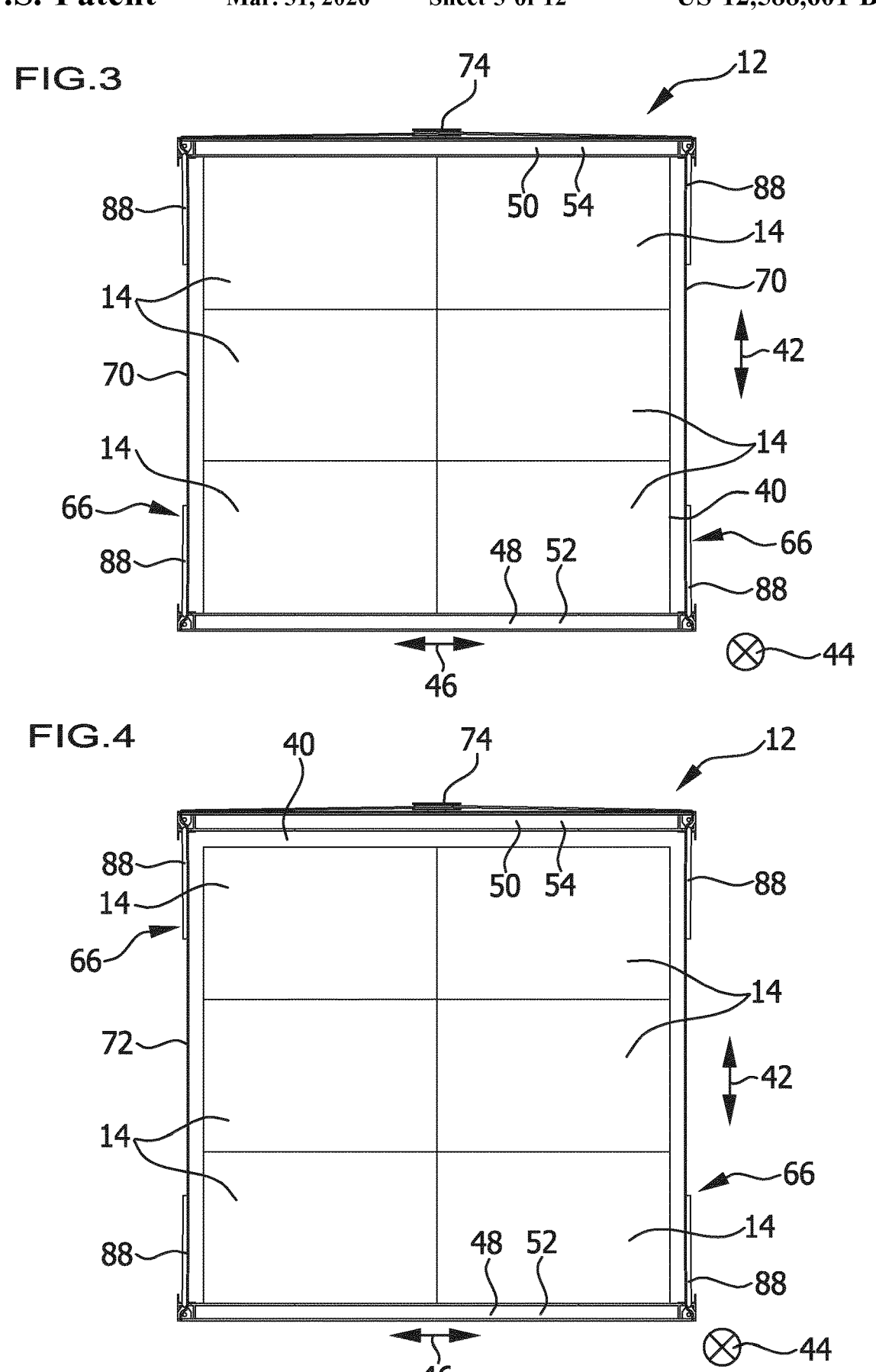
FIG. 3: shows a front view of the picking-up device from FIG. 2 in a transport state.
FIG. 4: shows a view corresponding to FIG. 3, wherein the picking-up device is shown in the filling state.

The side parts 48, 50 are interconnected via connection units 66. As explained below, the connection units 66 are designed to be variable in length. This makes it possible to transfer the side parts 48, 50 from the transport state into a filling state. For this purpose, the side parts 48, 50 can be moved along the first spatial direction 42. In the filling state, the side parts 48, 50 are at a greater distance from one another than in the transport state (FIGS. 3 and 4). The filling state of the side parts 48, 50 simultaneously includes a filling state of the picking-up device 12.

In the present case, the connection units 66 extend substantially along the first spatial direction 42 when the side parts 48, 50 assume the transport state and the filling state. Several connection units 66, which are spaced apart from one another along the spatial direction 44 and are in particular arranged equidistantly from one another, are arranged on each side part 48, 50. In the spatial direction 44, connection units 66 are arranged on the side parts 48, 50, at the end, in each case.

With regard to the spatial direction 46, connection units 66 are spaced apart from one another on each side part 48, 50 and are positioned on the sides, facing away from one another, of the side parts 48, 50 in each case.

The connection units 66 are arranged on each side part 48, 50 along the spatial direction 44 at the positions of the transverse profiles 60. Overall, seven connection units 66 are provided, wherein it is also possible for the number to be different.

The connection units 66 are configured identically.

Engagement openings 67 are present between adjacent connection units 66. Engagement in the receiving space 40 is possible through the engagement openings 67.

On the end side in relation to the spatial direction 44, the picking-up device 12 forms an insertion opening 68. The bales 14 can be conveyed into the receiving space 40 through the insertion opening 68. The insertion opening 68 extends in the spatial direction 42 between the side parts 48 and 50 and in the spatial direction 46 between the connection units 66.

In the intended use, the picking-up device 12 is positioned on the support device 24 such that the insertion opening 68 on the vehicle 16 points forwards, and the displacement device 34 is positioned in front of the insertion opening 68.

The picking-up device 12 is open at the side, opposite the insertion opening 68, along the second spatial direction 44.

The connection units 66 are variable in length in order to enable different relative spacings of the side parts 48 and 50. For this purpose, the connection units 66 each comprise a tensile element 70, which is designed in the present case as a cable 72, in particular, a steel cable 72.

Figure 2:
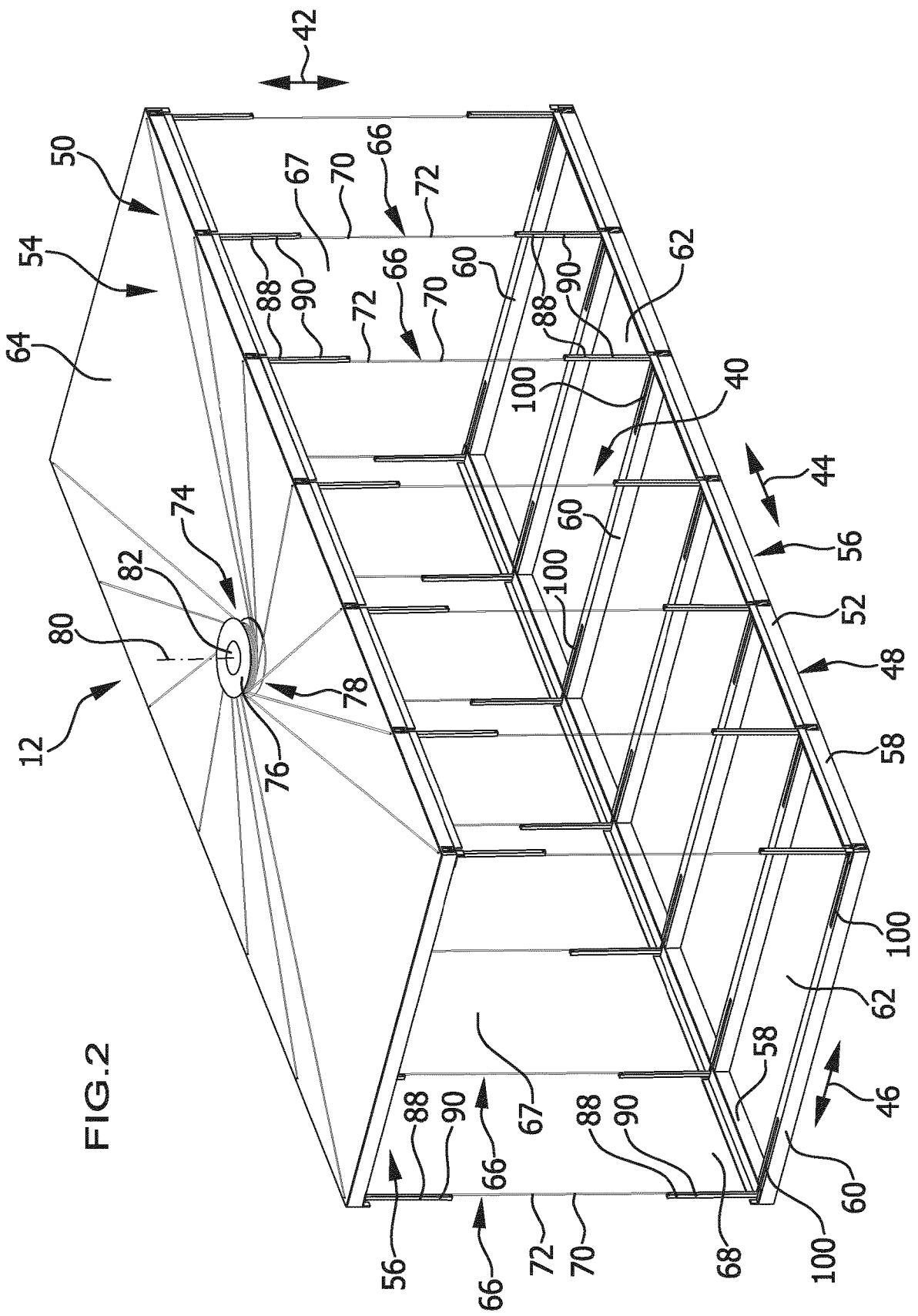
FIG. 2: shows a perspective schematic view of the picking-up device from FIG. 1 in a filling state.
Figure 6:
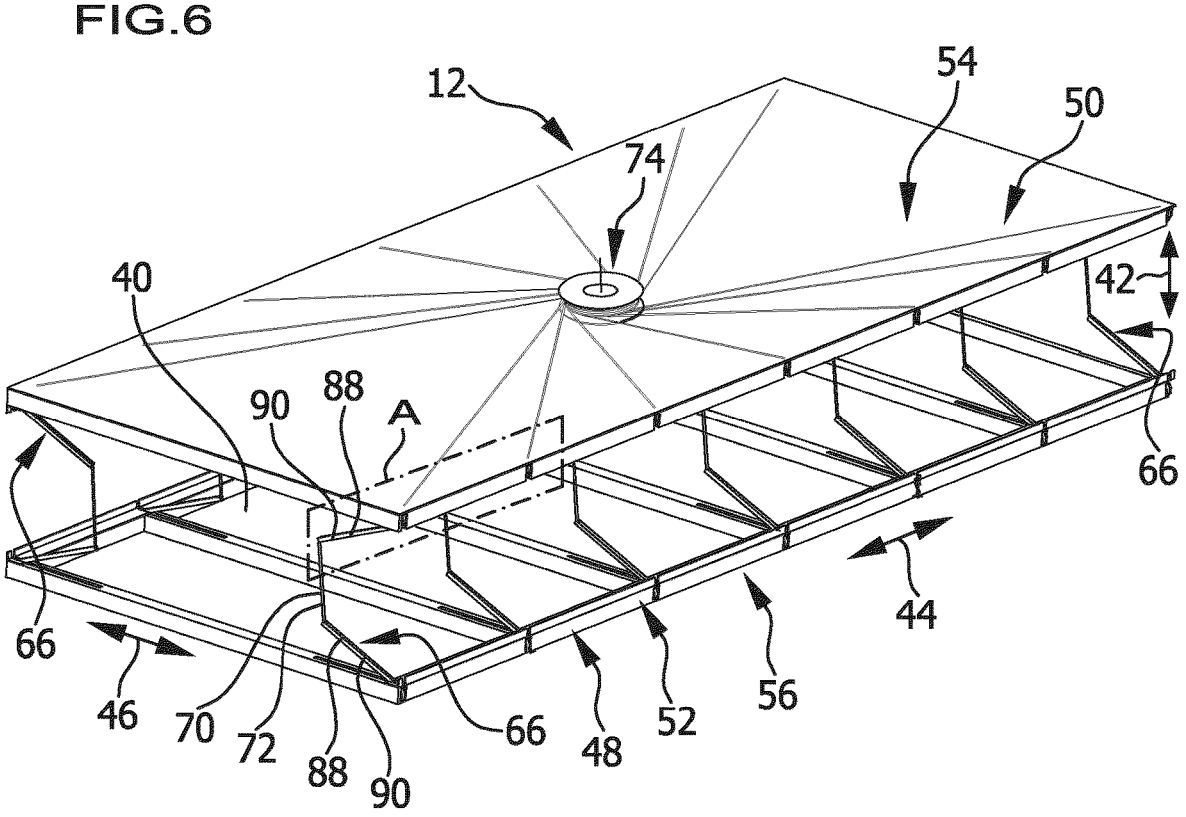
FIG. 6: shows a perspective view of the picking-up device during folding.

A storage device 74 is assigned to the tension elements 70. In the present case, a storage device 74 designed as a drum 76 is used for storing all cables 72 (FIGS. 2 and 6). The cables 72 can be wound onto the drum 76. As a result, the cables 72 can be tensioned. In contrast, the cables 72 can be unwound from the drum 76. As a result, the cables 72 can be transferred into a relaxed state, i.e., they can be less tensioned.

The storage device 74 can be regarded as a clamping device 78 of the picking-up device 12 or as a part of such a clamping device 78 (particularly in combination with the tension elements 70). In a clamping state, the cables 72 can be tensioned, and the side parts 48, 50 can be braced relative to one another. In a release state, the cables 72 can be set under lower tension or into a tension-free state in order to move the side parts 48, 50 relative to one another.

In the present example, the drum 76 is arranged on the cover element 64 and is rotatable about an axis 80 oriented along the spatial direction 42. A drive device 82 can be provided to rotate the drum 76 for winding and unwinding the cables 72.

In this case, a flat design is preferably provided, in order to keep the projection in the spatial direction 42 as small as possible. Alternatively, for example, an assembly of the drum 76 below the cover element 64 can be advantageous.

Figures 7, 10:
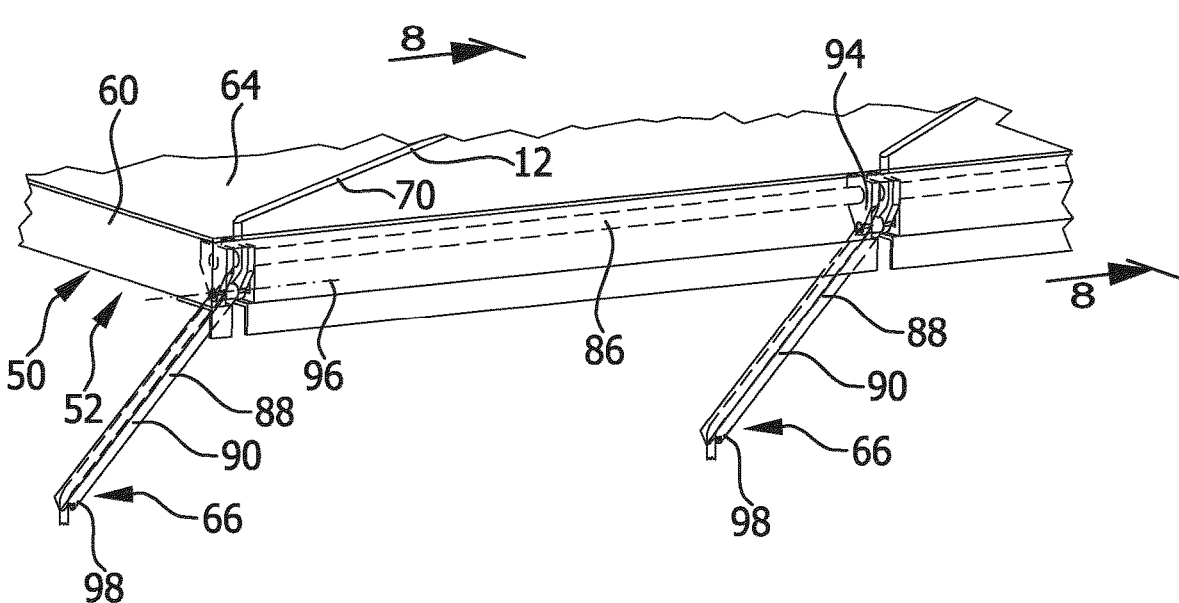
FIG. 7: shows an enlarged view according to Detail A in FIG. 6.
FIG. 10: shows a schematic detail view of a preferred embodiment of the picking-up device in accordance with the invention.
Figure 8:
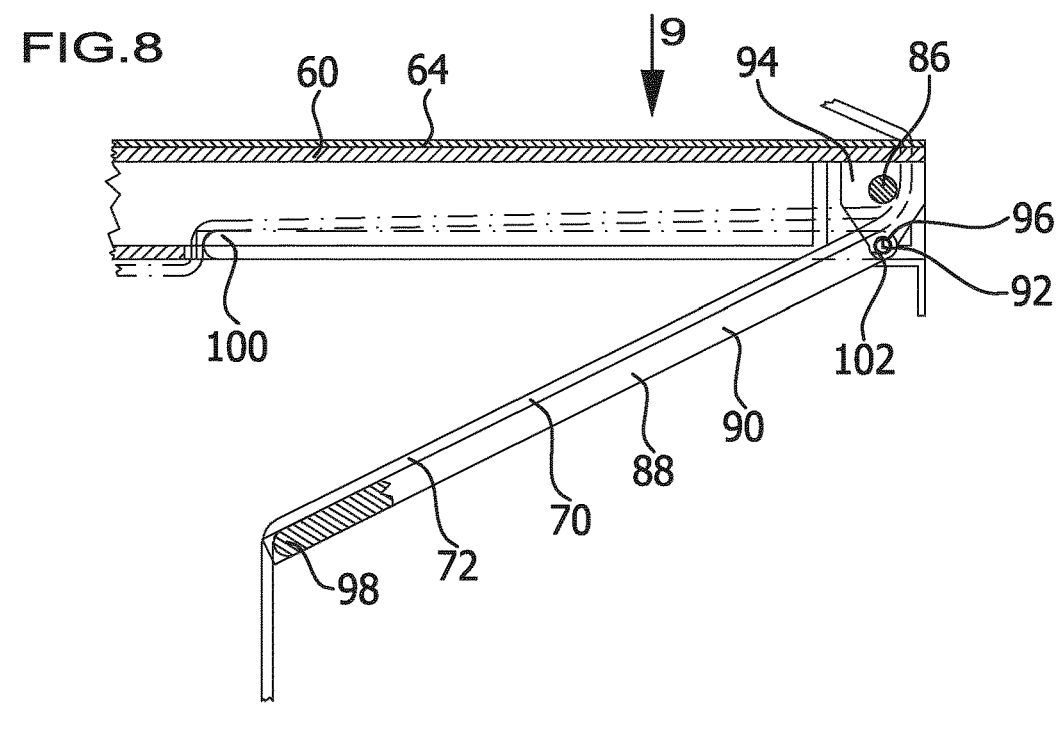
FIG. 8: shows a sectional view along the line 8-8 in FIG. 7.

A respective cable 72 is fixed at one end to the base part 52. The cable 72 extends in the direction of the cover part 54. A deflecting element 84 for deflecting the cable 72 in the direction of the drum 76 is provided on the cover part 54. The deflecting element 84 is, for example, a shaft 86 extending along the longitudinal profile 58 (FIGS. 7 and 8).

The drum 76 is arranged centrally on the cover element 64 so that the cables 72 run tangentially onto the drum 76.

The respective connection unit 66 comprises at least one and preferably two guide elements 88 for guiding the respective cable 72. Guide elements 88 are arranged on the base part 52 and on the cover part 54, and are of identical construction.

The guide element 88 is designed as a strip 90. The strip 90 is pivotably mounted, by a fixed end, on a pivot element 92. The pivot element 92 is in turn held on the longitudinal profile 58 via a holding part 94.

The pivot element 92 defines a pivot axis 96, in the present case, extending in the direction of the longitudinal profile 58. This makes it possible to pivot the strip 90 relative to the base part 52 or cover part 54 about the pivot axis 96. In this case, a free end 98 can assume a folded-out position relative to the respective side part 48, 50. In this case, the strip 90 points away from the side part 48, 50 in the direction of the respective other side part 50, 48.

By pivoting about the pivot axis 96, the strip 90 can assume a folded-in position. In the folded-in position, the distance of the free end 90 from the side part 48 or 50 is less than in the folded-out position.

In the folded-in position, the strip 90 can engage in a recess 100 which is formed on the respective transverse profile 60 and is arranged in the plane of the side part 48, 50.

The strip 90 can be folded out against the effect of at least one restoring element 102, which acts on the strip 90 with a force directed onto the respective side part 48, 50. In the present case, two restoring elements 102 in the form of torsion springs 104 are provided. The torsion springs 104 surround the pivot element 92 and engage the longitudinal profile 58 and the strip 90.

The restoring element 102 can, in particular, be a pretensioning element which acts on the strip 90 with a pretensioning force directed towards the side part 48, 50.

The cable 72 is guided on both side parts 48, 50 in such a way that it extends so as to face the receiving space 40, and rest on the guide element 88 (FIGS. 3 to 8).

In the already mentioned transport state, the base part 52 and the cover part 54 are spaced apart from one another along the spatial direction 42. Bales 14 are arranged in the receiving space 40.

The base part 52 and the cover part 54 are braced relative to one another by means of the clamping device 78 in a clamping state, such that the bales 14 are fixed in the receiving space 40. In this case, the bales 14 lie on the transverse profiles 60 of the base part 52. From above, the transverse profiles 60 of the cover part 54 lie on the bales 14 (FIG. 3).

The cables 72 are tensioned such that the base part 52 and the cover part 54 are braced against each other and against the bales 14. A separate load securing for the bales 14 is, in particular, not necessary.

For easier filling, and in a corresponding manner for unloading, of the receiving space 40, the base part 52, and the cover part 54 can be transferred relative to one another into a filling state (FIG. 4). For this purpose, the tension of the cables 72 can be reduced by means of the clamping device 78, and in particular by unwinding cables 72 from the drum 76. This allows the base part 52 and the cover part 54 to move relative to one another.

The relative movement of the base part 52 and the cover part 54 can take place in different ways. For example, a support device can be provided on the picking-up device 12 itself or as a component of the picking-up system 10, for example, on the vehicle 16. FIG. 1 schematically shows a support device provided with the reference numeral 106. The support device 106 allows, for example, the lifting of the cover part 54 so that the receiving space 40 is widened, and the bales 14 can be inserted or removed in a simpler manner.

Alternatively, the picking-up system 10, e.g., on the vehicle 16, can have a lifting device. The lifting device is shown schematically in FIG. 1 by reference numeral 108. For example, the lifting device 108 can be designed in a crane-like manner. It can be provided that the lifting device 108 engages the connection elements 28, for example.

To fix the bales 14, the cover part 54 is released again and moved closer to the base part 52, and the clamping device 78 is transferred into the clamping state.

Figure 5:
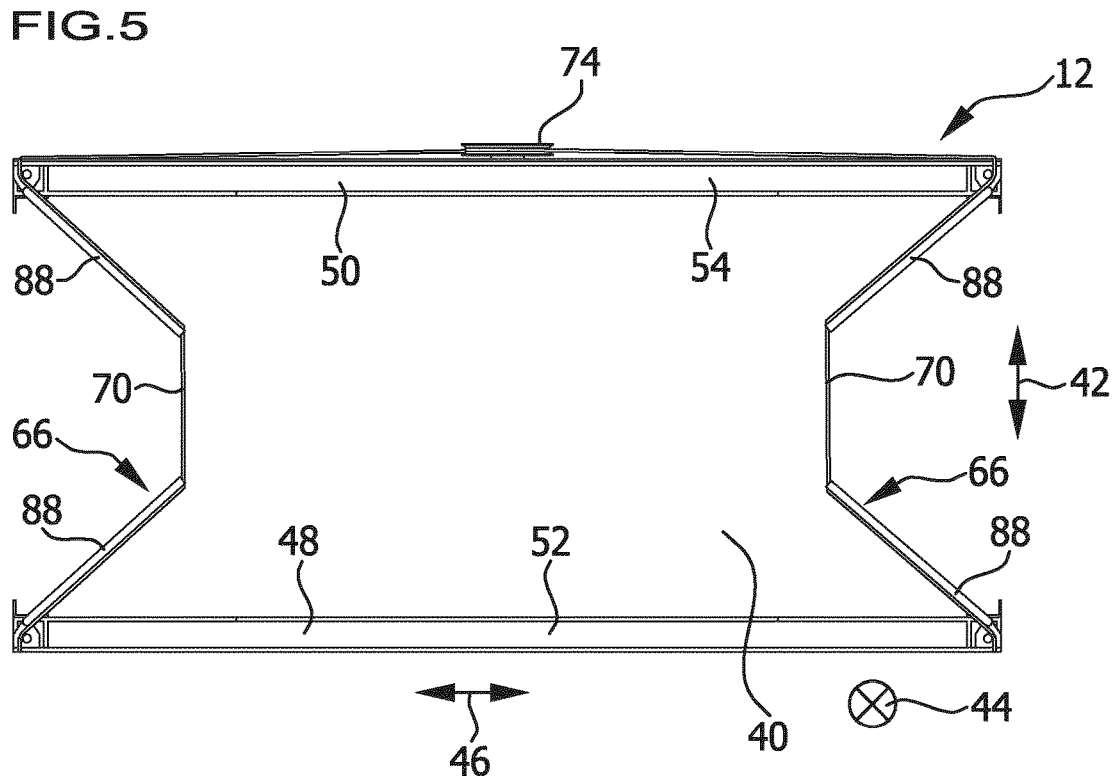
FIG. 5: shows a view corresponding to FIG. 4, wherein the picking-up device is shown during folding.

As can be seen in particular from FIGS. 5 and 6, the base part 52 and the cover part 54 can be transferred relative to one another into a space-saving storage state. Particularly when the receiving space 40 is empty, the cover part 54 can be lowered in the direction of the base part 52. For this purpose, a support device or a lifting device, for example, can be provided. The guide elements 88 fold from the folded-out state into the folded-in state by pivoting them at the longitudinal profiles 58. The cable 72 rests against the guide elements 88 and is thereby guided away from the edges of the picking-up device 12 into the narrowing receiving space 40. The cable length can be controlled via the drum 76 in such a way that the picking-up device 12 is tidily folded in, and the cable 72 does not sag.

It is possible to place the base part 52 and the cover part 54 against each other. This is not shown in the drawings; in this case, the guide elements 88 engage in the recess 100.

Preferably, a plurality of picking-up devices 12, folded together in this way in the storage state, can be stacked one above the other. For example, a connection of picking-up devices 12 lying one above the other is conceivable, for example, via the locking elements 26 and the connection elements 28.

Overall, the picking-up device 12 forms a frame which can be expanded for filling and unloading, and which can preferably be folded together for space-saving storage.

FIG. 10 is a schematic partial view of a longitudinal profile 58 with a drum 110, which could be used, for example, as a replacement for the drum 76, as a component of the storage device 74. The drum 110 is, for example, rotatable about an axis 112 extending in the spatial direction 46, and preferably attached to the cover part 54. The cables 72 on a longitudinal side of the picking-up device 10 can preferably be wound up via only one drum 110. A respective, e.g., roller-shaped, deflecting element 114 deflects the cable 72 in the direction of the respective other side part 48, 50.

Figure 11:
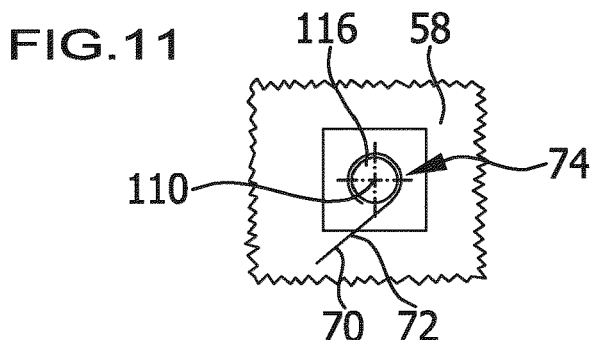
FIG. 11: shows a further schematic detail view of a preferred embodiment of the picking-up device in accordance with the invention.
Figure 9:
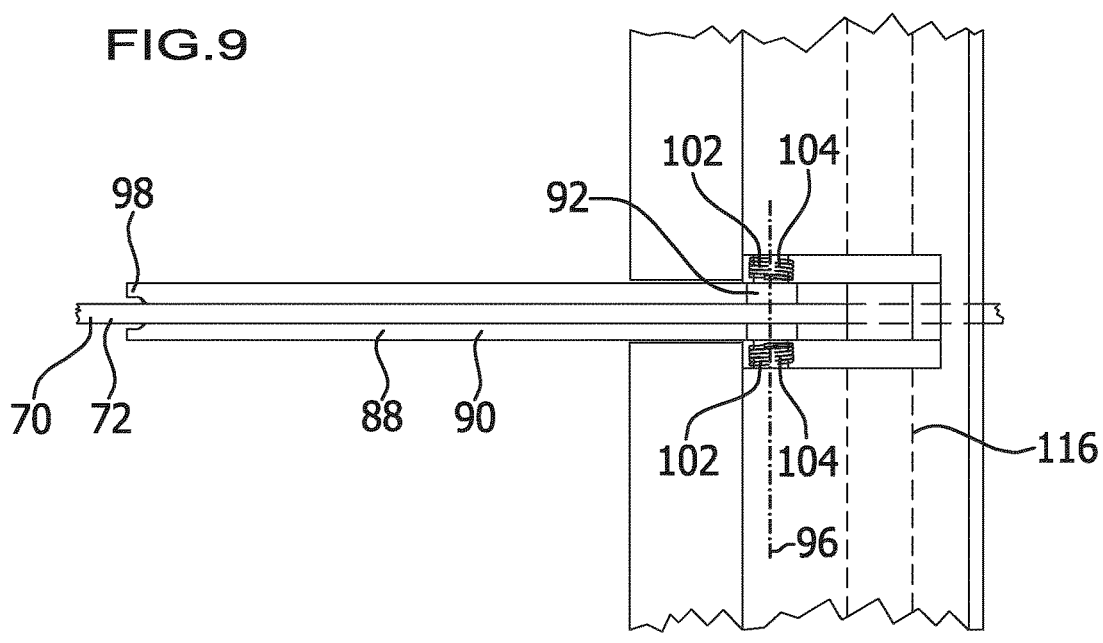
FIG. 9: shows a plan view of a detail of the picking-up device in the direction of the arrow "9", with some parts being masked.

FIG. 11 is a schematic view of a different shape of the storage device 74. In this case, a respective cable 72 can be wound, for example, onto a shaft 116 as a replacement for the drum 76. The shaft 116 is preferably arranged in the longitudinal profile 58 and rotatable about an axis 112 oriented in the spatial direction 44. This allows a particularly compact design of the storage device 74.

Figures 12, 13, 14:
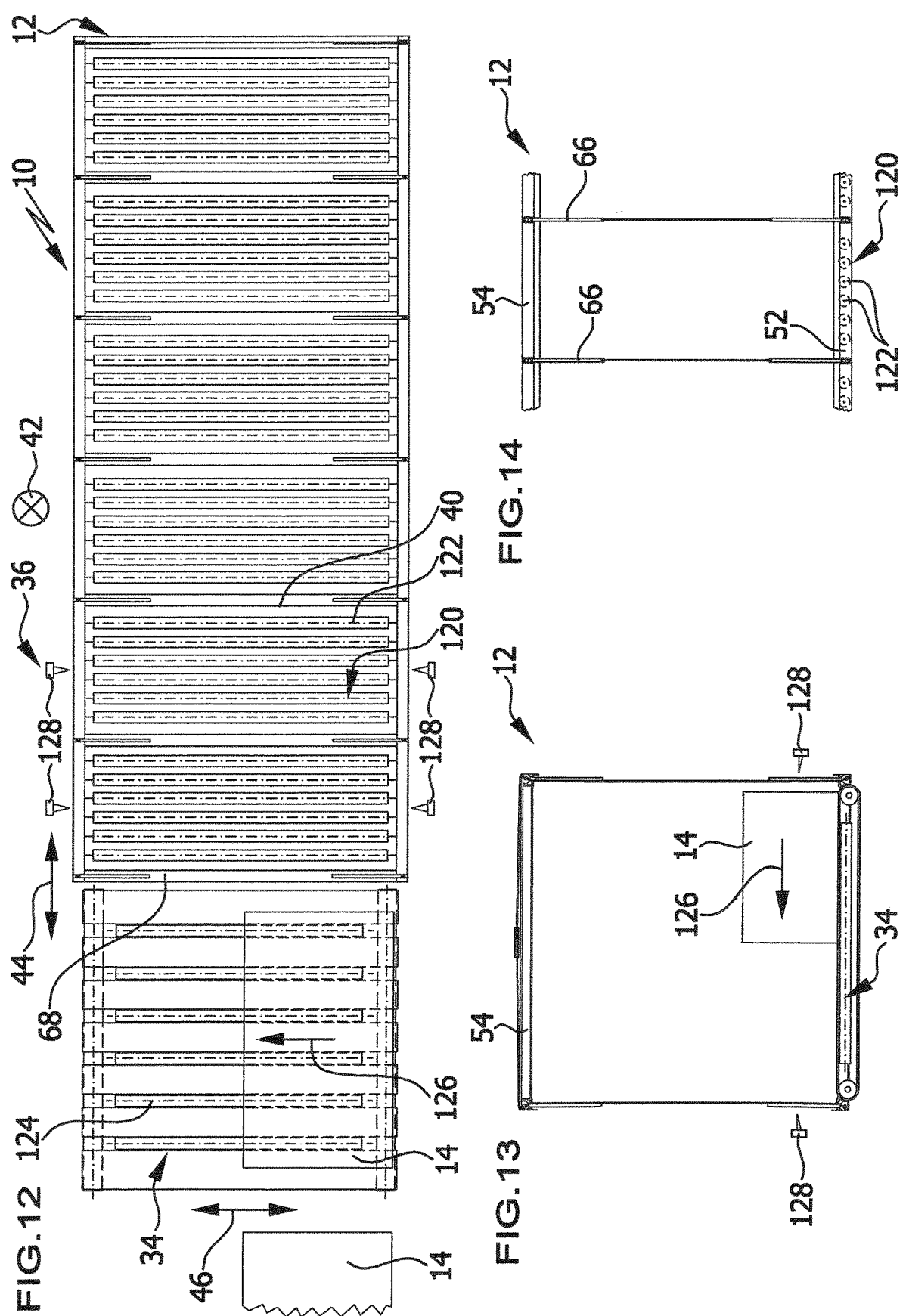
FIGS. 12 to 24: show schematic partial views of the picking-up system of FIG. 1, wherein the picking-up device thereof, a displacement device, and a lifting device are shown during filling of a receiving space of the picking-up device with bales of plant material.
Figures 15, 16:
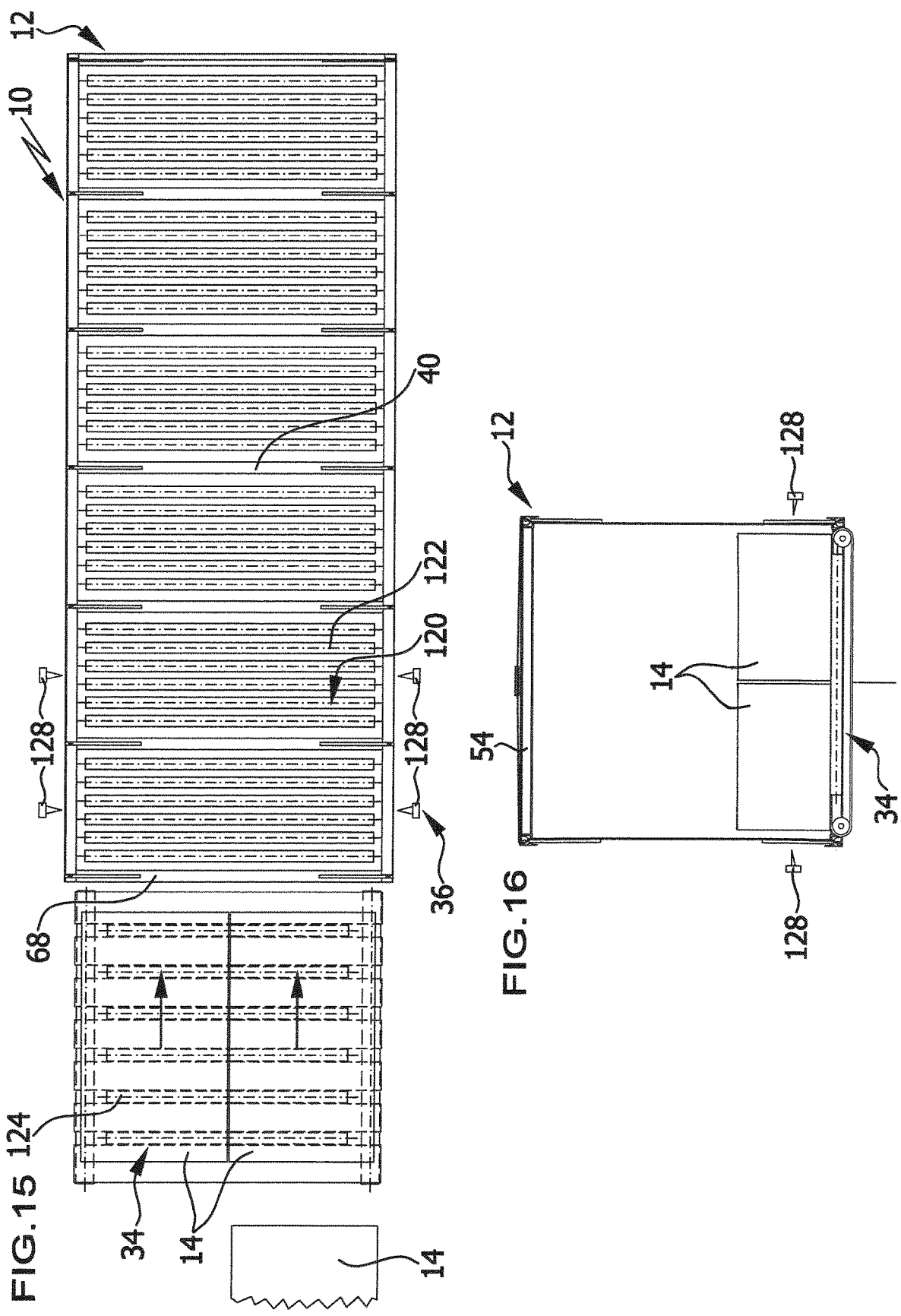

In the following, a method for filling the picking-up device 12 with the bales 14, explained with reference to FIGS. 12 to 24, is discussed, wherein the filling is carried out on the vehicle 16. FIGS. 12, 15, 17, 19, 21, and 22 show the picking-up device 12, the displacement device 34, and the lifting device 36 from above, without the cover part 54. FIGS. 13, 16, 18, 20, 22, and 24 show a view of the displacement device 34 and the picking-up device 12 arranged behind it, or only the picking-up device 12 from the front. FIG. 14 is a side view of the picking-up device 12.

The drawing sheets 7/12 to 12/12 each represent different filling steps.

The picking-up device 12 assumes the filling state.

The picking-up system 10 comprises a transport device 120 on the support device 24. In the present case, the transport device 120 comprises transport rollers 122. When the base part 52 rests on the support device 24, the transport rollers 122 can engage through the engagement openings 62 in the receiving space 40. The transport rollers 122 are rotatable about axes extending in the spatial direction 46. This makes it possible to easily move the bales 14 in the receiving space 40 by means of the transport rollers 122.

The displacement device 34 comprises a transport path 124. The bales 14 can be displaced in the spatial direction 46, upstream of the insertion opening 68, via the transport path 124 (arrow 126).

In the present case, the lifting device 36 is positioned directly adjacently to the insertion opening 68, in the spatial direction 44. The lifting device 36 comprises lifting elements 128 which engage in the receiving space 40, through the engagement openings 67, from mutually opposing sides, in the spatial direction 46, and can thereby be brought into engagement with the bales 14. The lifting elements 128 can be raised. In the present case, two, mutually-spaced lifting elements 128 are provided, e.g., on each side of the picking-up device 12 in the spatial direction 44.

First, a supplied bale 14 can be displaced by means of the displacement device 34 in the direction of the arrow 126 in such a way that a bale 14 supplied subsequently is arranged directly next to the first bale 14, and both bales 14 are positioned directly in front of the insertion opening 68 (FIGS. 12, 13, 15, and 16).

Subsequently, the two first bales 14 are displaced through the insertion opening 68 into the receiving space 40. This can preferably take place by means of the displacement device 34 or a separate transport device.

Figures 17, 18:
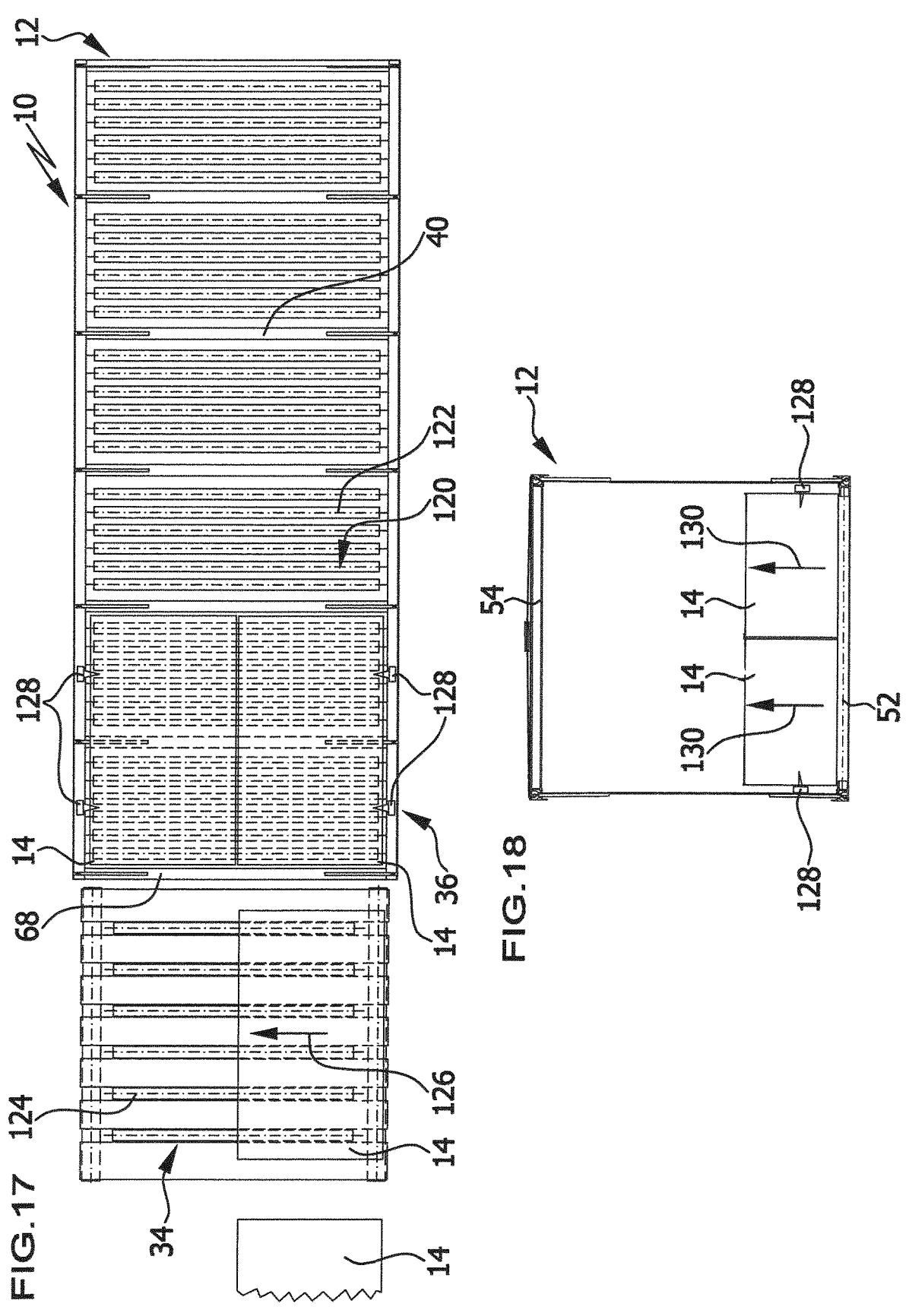

The bales 14 are displaced until they are positioned at the front, in the receiving space 40, between the lifting elements 128. The bales 14 can be lifted by means of the lifting elements 128 (FIGS. 17 and 18; arrow 130).

Figures 19, 20:
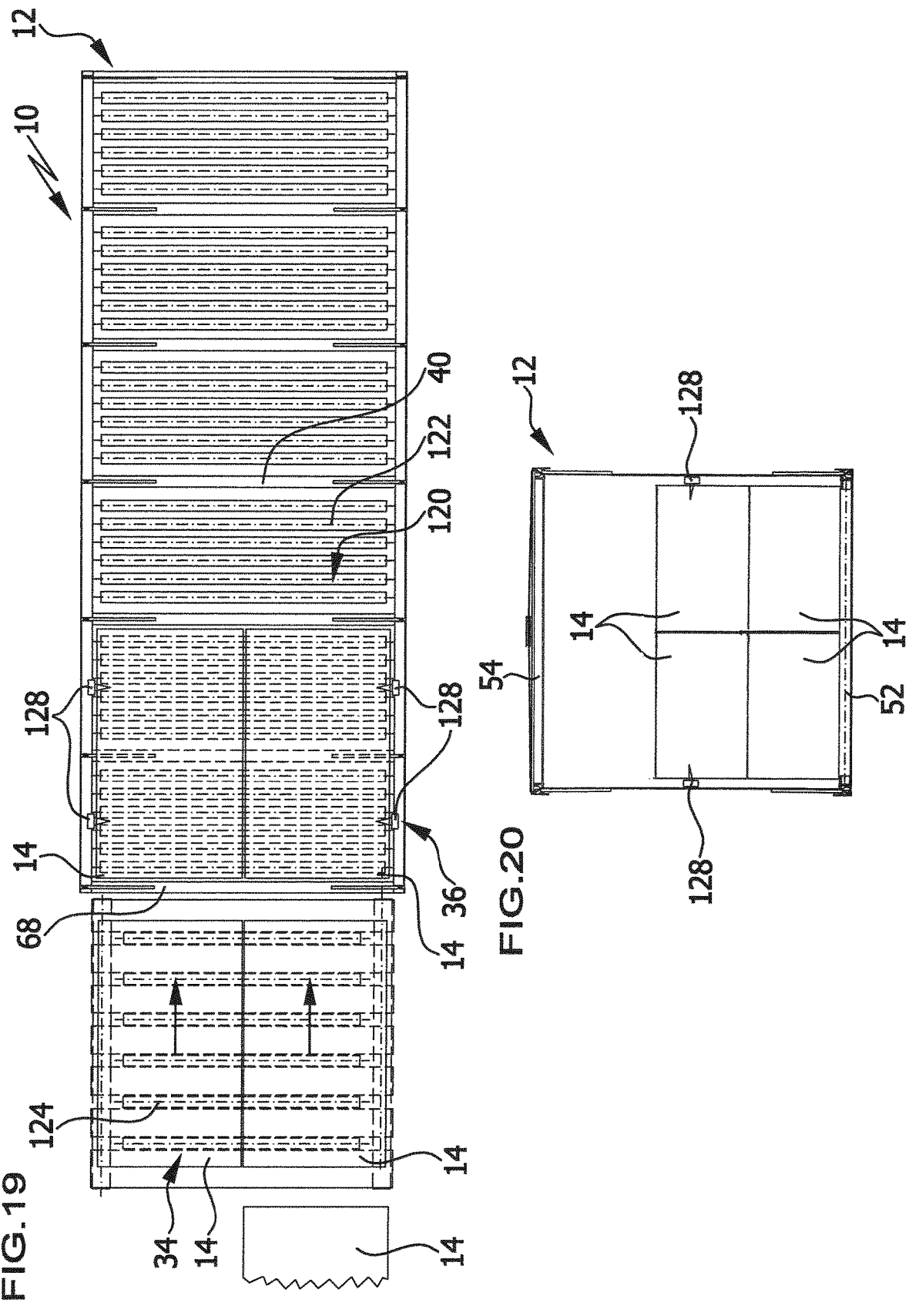

Further bales 14 can preferably be supplied simultaneously to the lifting process, positioned laterally next to one another, and arranged in front of the insertion opening 68 (FIG. 19). These newly-supplied bales 14 can be moved under the raised bales 14 into the receiving space 40 (FIG. 20).

Subsequently, the lifting elements 128 can engage the newly-supplied bales 14 and lift the now four bales 14. Two further bales 14 are positioned in front of the insertion

Figures 21, 22:
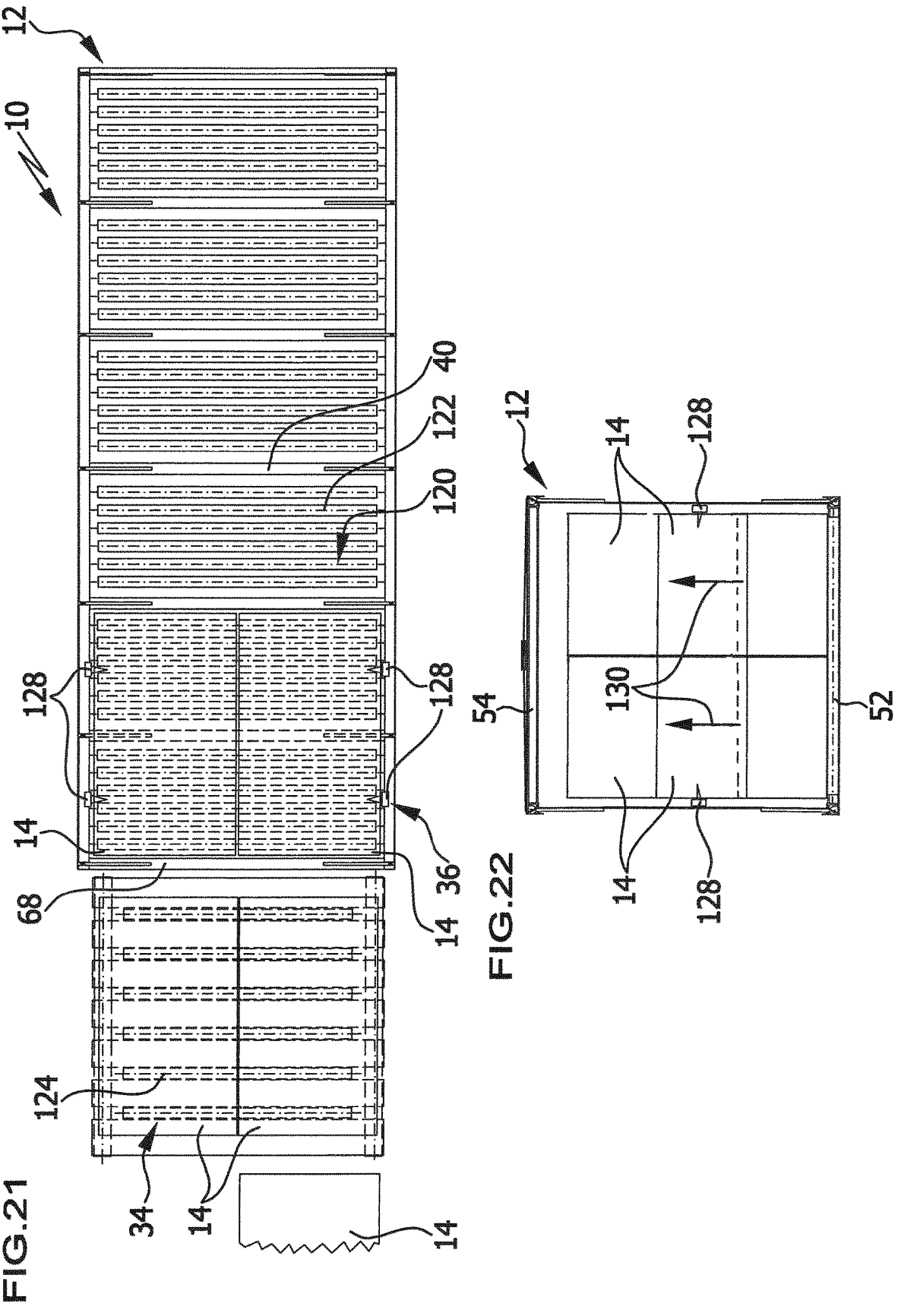
Figures 23, 24:
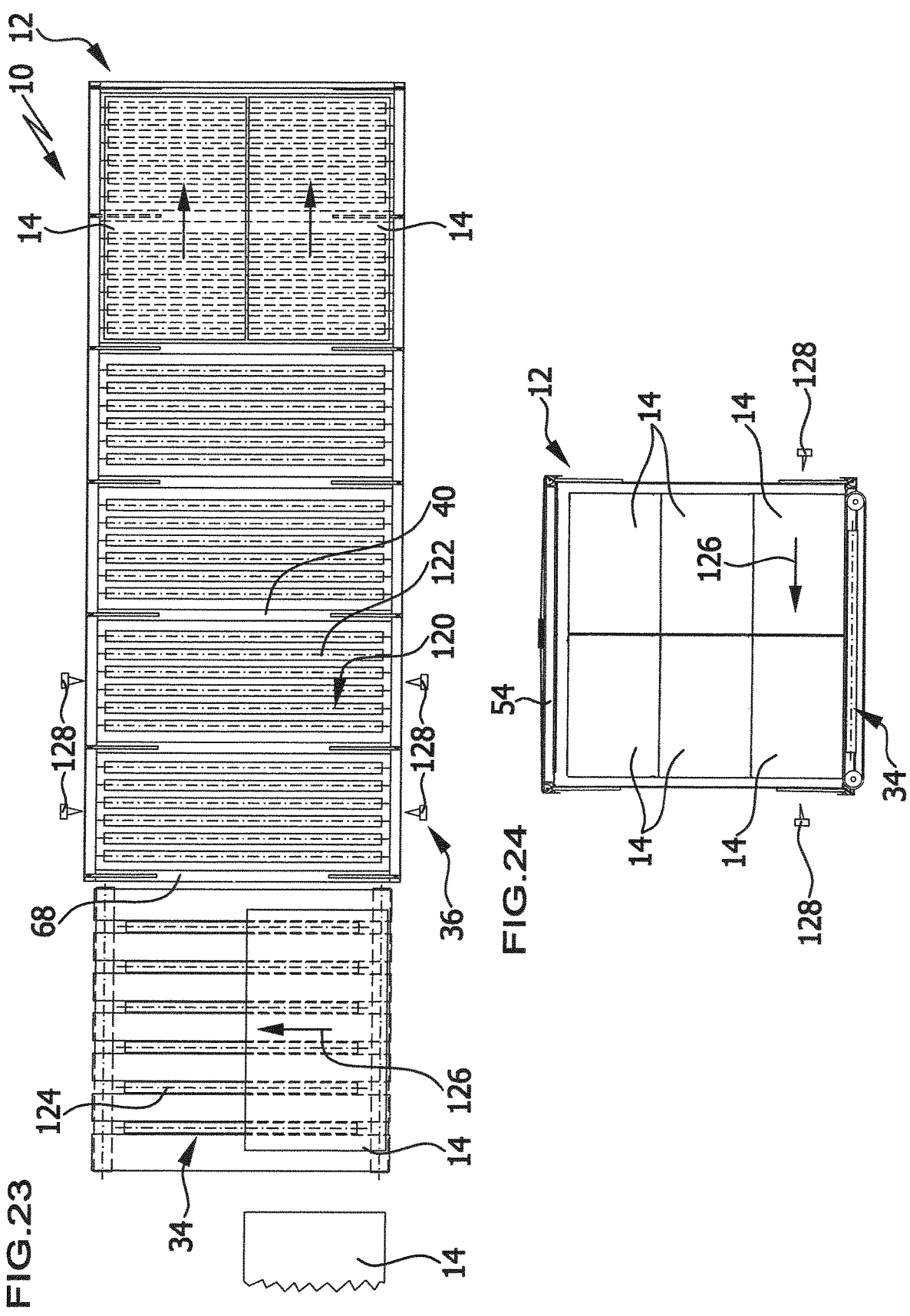

15 opening 68, via the displacement device 34. The two further bales 14 are pushed under the four raised bales 14 (FIGS. 21 and 22).

The set formed in this way from a total of six bales 14 is pushed over the transport rollers 122 to the end of the receiving space 40, and the process described above is repeated (FIGS. 23 and 24).

In the present case, the bales 14 are dimensioned such that, in the transport state, three bales 14 are arranged in a form-fitting manner in the receiving space 40 in the longitudinal direction, two in the transverse direction, and three in the height direction, and thus the best possible use can be made of the transport capacity of the picking-up device 12, having dimensions of a 20-foot container according to ISO standard 668.

LIST OF REFERENCE NUMERALS

10 picking-up system
12 picking-up device
14 bales
16 vehicle
18 traction drive
20 wheel
22 usable area
24 support device
26 locking element
28 connection element
30 collecting device
32 transport path
34 displacement device
36 lifting device
38 control device
40 receiving space
42 first spatial direction
44 second spatial direction
46 third spatial direction
48 first side part
50 second side part
52 base part
54 cover part
56 grating
58 longitudinal profile
60 transverse profile
62 engagement opening
64 cover element
66 connection unit
67 engagement opening
68 insertion opening
70 tension element
72 cable
74 storage device
76 drum
78 clamping device
80 axis
82 drive device
84 deflecting element
86 shaft
88 guide element
90 strip
92 pivot element
94 holding part
96 pivot axis
98 free end
100 recess
102 restoring element
104 torsion spring

16

106 support device
108 lifting device
110 drum
112 axis
114 deflecting element
116 shaft
118 axis
120 transport device
122 transport roller
124 transport path
126 arrow
128 lifting element
130 arrow

The invention claimed is:

1. A Picking-up device for bales formed by compression of a plant material, comprising a first side part, a second side part spaced apart relative thereto in a first spatial direction, and connecting units for connecting the side parts along the first spatial direction, wherein the side parts are designed to assume a transport state relative to one another in which a receiving space is defined between the side parts and bales are positioned, for transport purposes, between the side parts in the receiving space, and to assume a filling state in which the side parts are at a greater distance relative to one another in the first spatial direction than in the transport state and in which the bales are insertable into the receiving space along a second spatial direction, transverse to the first spatial direction, via an insertion opening arranged between the side parts, wherein the picking-up device comprises or forms a clamping device, under the action of which, in a clamping state, the first side part and the second side part are braced relative to one another in the transport state, wherein the clamping device is transferable into a release state in which the side parts are movable relative to one another in order to assume the filling state, and wherein at least one of the first side part and the second side part comprises locking elements adapted to fix the picking-up device to a support device and/or adapted to fix the picking-up device to a picking up device of the same design.

2. The Picking-up device in accordance with claim 1, wherein several connection units are provided, between which the receiving space is arranged and which are spaced apart from one another along a third spatial direction, which is oriented transverse to the first spatial direction and transverse to the second spatial direction, and engage in each case the first side part and the second side part.

3. The Picking-up device in accordance with claim 1, wherein a plurality of connection units, which are spaced apart from one another in the second spatial direction, are provided, between which in each case an engagement opening is formed in the receiving space, and/or in that a connection unit is arranged in each case at the end of the picking-up device in the third spatial direction.

4. The Picking-up device in accordance with claim 1, wherein the insertion opening is formed on an end side of the picking-up device between the side parts.

5. The Picking-up device in accordance with claim 1, wherein the picking-up device is open at the insertion opening in the transport state and/or wherein the picking-up device is open opposite the insertion opening, in relation to the second spatial direction.

6. The Picking-up device in accordance with claim 1, wherein the side parts are interconnected in the filling state, and wherein the connection units are designed to be variable in length in order to enable the transfer of the side parts from the transport state to the filling state and vice versa.

7. The Picking-up device in accordance with claim 1, wherein the first side part is a base part of the picking-up device, and wherein the second side part is a cover part of the picking-up device.

8. The Picking-up device in accordance with claim 7, wherein at least one the following applies:

the cover part comprises or forms a plate-shaped cover element which covers the receiving space at least in part;

engagement openings for a transport device to engage in the receiving space are formed in the base part.

9. The Picking-up device in accordance with claim 1, wherein the first side part and/or the second side part is formed as or comprises a grating.

10. The Picking-up device in accordance with claim 1, wherein the picking-up device is designed as a frame which is expandable from the filling state into the transport state in the first spatial direction, or comprises such a frame.

11. The Picking-up device in accordance with claim 1, wherein at least one the following applies:

the picking-up device is free of side walls between the side parts;

the picking-up device is free of intermediate floors and/or free of intermediate walls in the receiving space.

12. The Picking-up device in accordance with claim 1, wherein the bales are held, in the transport state, by the side parts, and the picking-up device is free of a separate load securing means for the bales.

13. The Picking-up device in accordance with claim 1, wherein the connection units each comprise a tension element which engages the first side part and the second side part, wherein the picking-up device comprises at least one clamping device for tensioning the respective tension element, and wherein the first side part and the second side part, relative to one another, are braceable against one another under a tensioning effect of the tension element.

14. The Picking-up device in accordance with claim 13, wherein the tension element is a cable, a belt or a steel cable.

15. The Picking-up device in accordance with claim 13, wherein at least one storage device is provided for the tension element, wherein the tension element is tensible or relaxable by acting on the storage device.

16. The Picking-up device in accordance with claim 13, wherein the respective connection unit comprises a guide element on at least one of the side parts, along which guide element the tension element is guided in portions.

17. The Picking-up device in accordance with claim 16, wherein the guide element is hinged to the side part and is pivotable relative thereto about a pivot axis.

18. The Picking-up device in accordance with claim 16, wherein at least one the following applies:

the guide element is transferable from a folded-out position into a folded-in position, wherein a free end of the guide element is farther away from the side part in the folded-out position than in the folded-in position;

the guide element is arranged, in the folded-in position, in a plane defined by the side part, and/or is placeable against the side part.

19. The Picking-up device in accordance with claim 1, wherein the side parts are transferable relative to one another from the transport state into a storage state in which the distance of the side parts from one another along the first spatial direction is smaller than in the transport state.

20. The Picking-up device in accordance with claim 19, wherein the side parts are placeable against each other in the storage state and/or wherein the picking-up device is storable folded together and flat.

21. The Picking-up device in accordance with claim 1, wherein a plurality of picking-up devices is stackable one above the other.

22. The Picking-up device in accordance with claim 1, wherein the picking-up device is cuboid at least in the transport state of the side parts.

23. The Picking-up device in accordance with claim 1, wherein at least one of the following applies:

the receiving space has a length which corresponds approximately to an integer multiple of a length of the bale;

the receiving space has a width which corresponds approximately to an integer multiple of a length of the bale;

the receiving space has a height which corresponds approximately to an integer multiple of a length of the bale.

24. The Picking-up device in accordance with claim 1, wherein, in the transport state of the side parts, the picking-up device has dimensions of a 20-foot container or a 40-foot container of the ISO 668 standard.

25. A Picking-up system for a bale which is formed by compression of a plant material, comprising a support device and at least one picking-up device which is releasably placeable on the support device, the picking-up device comprising a first side part, a second side part spaced apart relative thereto in a first spatial direction, and connecting units for connecting the side parts along the first spatial direction, wherein the side parts are designed to assume a transport state relative to one another in which a receiving space is defined between the side parts and bales are positioned, for transport purposes, between the side parts in the receiving space, and to assume a filling state in which the side parts are at a greater distance relative to one another in the first spatial direction than in the transport state and in which the bales are insertable into the receiving space along a second spatial direction, transverse to the first spatial direction, via an insertion opening arranged between the side parts, wherein the picking-up device comprises or forms a clamping device, under the action of which, in a clamping state, the first side part and the second side part are braced relative to one another in the transport state, wherein the clamping device is transferable into a release state in which the side parts are movable relative to one another in order to assume the filling state, and wherein at least one of the first side part and the second side part comprises locking elements adapted to fix the picking-up device to a support device and/or adapted to fix the picking-up device to a picking-up device of the same design.

26. The Picking-up system in accordance with claim 25, wherein a transport device which engages in engagement openings formed in the base part is arranged on the support device for transporting bales in the receiving space in the second spatial direction.

27. The Picking-up system in accordance with claim 25, wherein a displacement device for bales is arranged on the support device, upstream of the insertion opening, for the purpose of moving the bales in the third spatial direction.

28. The Picking-up system in accordance with claim 25, wherein the picking-up system comprises a lifting device for bales, by means of which at least one bale is raiseable and placeable on a bale positioned or positionable underneath.

29. The Picking-up system in accordance with claim 28, wherein at least one of the following applies:

the lifting device is positioned behind the insertion opening in the second spatial direction;

the lifting device comprises lifting elements which can engage in the receiving space from sides, facing away from one another, of the picking-up device in the third spatial direction.

30. The Picking-up system in accordance with claim 25, wherein the picking-up system comprises or forms a vehicle comprising a traction drive, being designed to be self-propelled and self-steering.

31. A Picking-up device for bales formed by compression of a plant material, comprising a first side part, a second side part spaced apart relative thereto in a first spatial direction, and connecting units for connecting the side parts along the first spatial direction, wherein the side parts are designed to assume a transport state relative to one another in which a receiving space is defined between the side parts and bales are positioned, for transport purposes, between the side parts in the receiving space, and to assume a filling state in which the side parts are at a greater distance relative to one another in the first spatial direction than in the transport state and in which the bales are insertable into the receiving space along a second spatial direction, transverse to the first spatial direction, via an insertion opening arranged between the side parts, wherein the connection units each comprise a tension element which engages the first side part and the second side part, wherein the picking-up device comprises at least one clamping device for tensioning the respective tension element, and wherein the first side part and the second side part, relative to one another, are braceable against one another under a tensioning effect of the tension element.

* * * * *